US006229300B1

United States Patent
Dlugos

(10) Patent No.: US 6,229,300 B1
(45) Date of Patent: May 8, 2001

(54) WIEGAND TILT SENSOR

(75) Inventor: David J. Dlugos, Beacon Falls, CT (US)

(73) Assignee: HID Corporation, Irvine, CA (US)

( * ) Notice: Subject to any disclaimer, the term of this patent is extended or adjusted under 35 U.S.C. 154(b) by 0 days.

(21) Appl. No.: 09/204,692

(22) Filed: Dec. 3, 1998

(51) Int. Cl.[7] ........................................... G01B 7/14
(52) U.S. Cl. ........................ 324/207.13; 73/514.31; 307/419
(58) Field of Search ................ 324/207.13, 207.14, 324/260, 174; 307/419, 10.1; 73/514.16, 514.31

(56) References Cited

U.S. PATENT DOCUMENTS

| | | |
|---|---|---|
| 3,820,090 | 6/1974 | Wiegand . |
| 4,247,601 | 1/1981 | Wiegand . |
| 4,263,523 | 4/1981 | Wiegand . |
| 4,484,090 | 11/1984 | Wiegand et al. . |
| 4,593,209 | 6/1986 | Sloan . |
| 4,736,122 | 4/1988 | Opie et al. . |
| 4,743,780 | 5/1988 | Opie . |
| 4,758,742 | 7/1988 | Opie . |
| 5,430,334 | * 7/1995 | Meister ................................ 307/10.1 |

OTHER PUBLICATIONS

Sensor Engineering Co. (an Echlin Co.) 1990 "Zero Power Wiegand Sensor" 2 pgs, Date not available.

* cited by examiner

Primary Examiner—Jay Patidar
(74) Attorney, Agent, or Firm—Reed Smith LLP

(57) ABSTRACT

A tilt sensor utilizes the "Wiegand Effect" to sense the occurrence of a tilting of the sensor from one inclined position to a horizontal position to another inclined position. The tilt sensor includes within a plastic or other non-magnetic body a non-magnetic elongated tube, a magnet that is contained and substantially freely slidable within the elongated tube, and a Wiegand wire that extends along and that is adjacent to the elongated tube. The tilt sensor also generally includes a coil wound on the Wiegand wire and a pole piece that extends along and that is adjacent to the elongated tube through which the Wiegand wire extends, and the pole piece is made of a material through which a magnetic flux path can be created. In operation, as the tilt sensor is moved from one inclined position to another inclined position, the magnet within the elongated tube slides from one end of the tube to the other. As the magnet slides, the direction of the magnetic flux flowing through the Wiegand wire changes direction resulting in the generation of a Wiegand pulse on the coil. The occurrence of a pulse on the coil represents the tilt that is sensed by the sensor.

16 Claims, 1 Drawing Sheet

WIEGAND TILT SENSOR

BACKGROUND OF THE INVENTION

This invention relates to a tilt sensor and is particularly directed to a tilt sensor that utilizes the "Wiegand Effect" to sense when the sensor is moved from one inclined position through a horizontal position to another inclined position.

Known tilt sensors are used in various devices and in various industries. For example, Mercury switches in thermostats and other devices utilize the electrically conductive properties of Mercury and its liquid state to effectively detect when the Mercury within the device flows from one position to another position. Generally, the motion of the Mercury is caused by some tilting of the device. However, while such tilt sensors are easy to manufacture and generally are reliable, the Mercury itself is environmentally unfriendly.

It is therefore an object of this invention to provide a tilt sensor that does not utilize Mercury.

It is another object of this invention to provide a tilt sensor that is, in a sense, self-powered such that the sensor itself does not require an external power source to operate.

Various other objects, advantages and features of the present invention will become readily apparent to those of ordinary skill in the art, and the novel features will be particularly pointed out in the appended claims.

SUMMARY OF THE INVENTION

In accordance with an embodiment of the present invention, a tilt sensor and corresponding method carried out by the tilt sensor are provided by a non-magnetic elongated tube, a magnet contained and substantially freely slidable within the elongated tube, and a Wiegand wire extending along and adjacent to the elongated tube.

As an aspect of the invention, the tilt sensor also includes a pole piece that extends along and is adjacent to the elongated tube, the pole piece is made of a material through which a magnetic flux path can be created, and the Wiegand wire extends within a portion of a hollow interior of the pole piece.

As another aspect of the invention, the tilt sensor further includes a coil wound on the Wiegand wire.

As a feature of the present invention, a first pulse of a first polarity is produced on the coil as the magnet slides in a first direction within the elongated tube, and a second pulse of a second polarity is produced on the coil as the magnet slides in a second direction opposite to the first direction within the elongated tube, the second polarity being opposite the first polarity.

As another feature of the present invention, magnetic flux flows through the Wiegand wire in a first direction when the magnet is in a first position within the elongated tube, and magnetic flux flows through the Wiegand wire in a second direction when the magnet is in a second position within the elongated tube, the second direction being opposite to the first direction.

In accordance with another embodiment of the present invention, the above-mentioned tilt sensor additionally includes another Wiegand wire that extends along and is adjacent to a portion of the elongated tube to which the first Wiegand wire is not adjacent.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

The tilt sensor of the present invention employs what has come to be known as the Wiegand Effect that is described in U.S. Pat. No. 3,820,090. As discussed below, the present invention utilizes a two-pole magnet freely movable along a linear path in combination with a Wiegand wire having a pickup coil wound thereon and a magnetic conduit or so-called pole-piece. Generally, all of the components are included within a plastic housing.

As is known, the Wiegand wire is a ferro magnetic wire having core and shell portions with divergent magnetic properties. The currently preferred type of Wiegand wire is disclosed in U.S. Pat. No. 4,247,601, issued on Jan. 27, 1981, and which is incorporated herein by reference. In other types of applications, the Wiegand wire is used in combination with a read head which provides an output pulse from a switch in state of the Wiegand wire. Examples of such a read head are described in U.S. Pat. Nos. 4,263,523, 4,593,209 and 4,736,122. Another read head is disclosed in co-pending patent application Ser. No. 09/015,873, filed Jan. 29, 1998, which is incorporated herein by reference.

Figure 1:
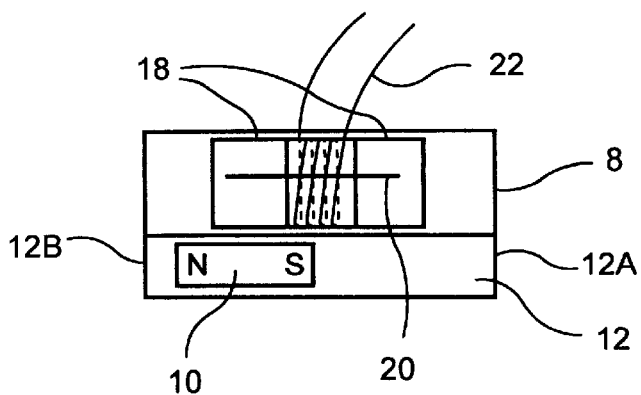
FIG. 1 is a schematic illustration of the Wiegand tilt sensor of the present invention.
Figure 2:
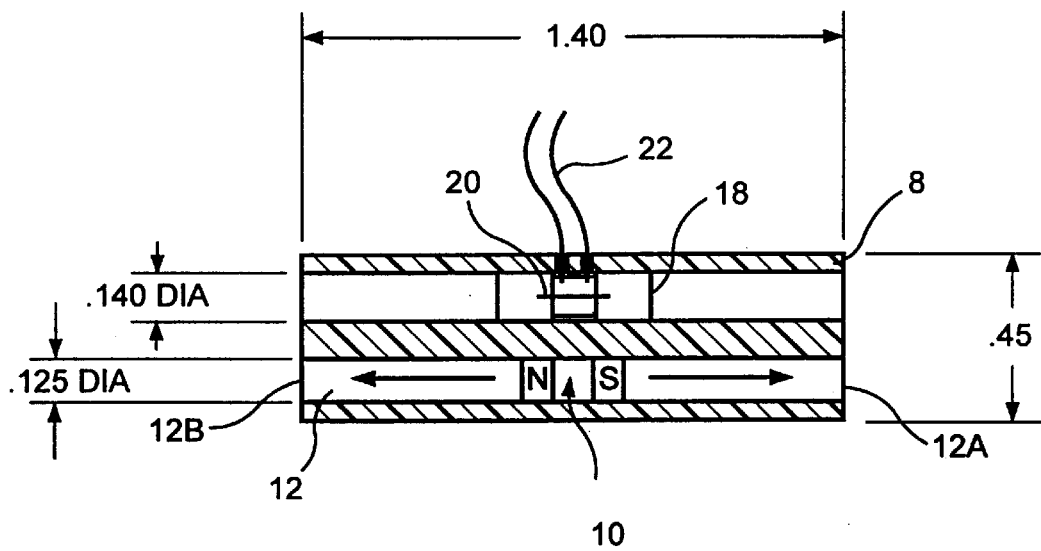
FIG. 2 is another schematic illustration of the Wiegand tilt sensor of the present invention.

Referring now to the drawings, FIGS. 1 and 2 are schematic illustrations of the Wiegand tilt sensor of the present invention. As shown, the sensor includes a two-pole magnet 10 having its north and south poles in the position shown. Of course, the north and south poles can be reversed. Magnet 10 is retained, but freely slidable within a closed non-magnetic elongated tube 12. When tube 12 is moved (i.e., slanted) so that one of its ends 12A is lower than the other end 12B, magnet 10 slides downward, due to gravity, until the south pole of magnet 10 abuts against end 12A of tube 12. If, on the other hand, tube 12 is slanted in the opposite direction resulting in end 12B being higher than end 12A, magnet 10 slides downward in the opposite direction to its previous sliding until the north pole of magnet 10 abuts against end 12B of tube 12.

Tube 12, with magnet 10 therein, is an integral part of a plastic housing 8 (or other suitable non-magetic housing). Alternatively, tube 12 is retained within plastic housing 8. In either case, plastic housing 8 serves to form the body of the Wiegand tilt sensor of the present invention and also serves to retain tube 12 in the desired positional arrangement with the remaining components of the Wiegand tilt sensor, as further discussed below.

The Wiegand tilt sensor further includes a Wiegand wire 20, a pickup coil 22 wound on the Wiegand wire, and an elongated magnetic cylinder 18 through which the Wiegand wire extends. As will be discussed, a pulse is produced on pickup coil 22, indicating the occurrence of a tilting motion of the Wiegand tilt sensor, in response to the sliding of magnet 10. Cylinder 18 is magnetic thus allowing a magnetic flux path to flow therethrough and for convenience herein is identified as a focusing pole piece. Cylinder (or pole piece) 18 is made of any suitable material through which a magnetic flux path can flow and has any shape wherein the direction of magnetization resulting from magnet 10 is "seen" by Wiegand wire 20. In the preferred embodiment, the pole piece is cylindrical in shape wherein Wiegand wire 20 extends within the pole piece. Also, the Wiegand wire may extend near the two ends of pole piece 18, as shown in FIG. 1, or, alternatively, pole piece 18 may extend substantially beyond the Wiegand wire such as shown in FIG. 2.

Pole piece 18 (with Wiegand wire 20 therein) is retained within plastic housing 8 in the manner shown in FIGS. 1 and 2. As previously discussed, magnet 10 is freely slidable within tube 12. When magnet 10 is in the position where its north pole abuts against or is near end 12B (the position shown in FIG. 1), the south pole of magnet 10 is adjacent to pole piece 18. Conversely, when the south pole of magnet 10 abuts against or is near end 12A, the north pole of magnet 10 is adjacent to pole piece 18. In the alternative embodiment shown in FIG. 2, neither the north or south poles of magnet 10 is adjacent to pole piece 18 when the magnet is at either end of tube 12. In either case, however, the resultant effect of the tilt sensor is the same when magnet 10 travels from one end of tube 12 to the other end, as discussed below.

Given the above construction of the Wiegand tilt sensor of the present invention, shown in either FIG. 1 or FIG. 2, the operation of the tilt sensor is discussed in detail hereinafter. In accordance with the present invention, the tilt sensor generates an output pulse on coil 22 each time the sensor is tilted from one inclined position to another inclined position. This output pulse is produced as a result of magnet 10 passing by Wiegand wire 20. The output pulse then is supplied to any appropriate circuit (not shown) which operates accordingly in response to the sensed tilting of the tilt sensor. The tilt sensor of the present invention may or may not be contained within such circuit, generally depending on the particular application.

For convenience herein, when end 12B of tube 12 is lower than the other end 12A of tube 12 (i.e., when the tilt sensor is in any position which has caused the north pole of magnet 10 to be placed near side 12B), the tilt sensor is said to be in a "positive inclined position." The tilt sensor is said to be in a "negative inclined position" when end 12A of tube 12 is lower than end 12B. Also, for purposes herein, it is assumed that tube 12 is frictionless. While tube 12 is not frictionless in reality, any effect caused by the small amount of friction is negligible.

Assuming an initial state of a positive inclined position of the tilt sensor of the present invention, pole N of magnet 10 is near end 12B of tube 12. In the embodiment shown in FIG. 1, pole S of magnet 10 is adjacent to focusing pole piece 18 creating a magnetic flux path from pole N of magnet 10, through the end of pole piece 18, through Wiegand wire 20 to pole S of magnet 10. The direction of the flux path through Wiegand wire 20 in this instance is identified for convenience herein as "the positive direction." At this time, Wiegand wire 10 is forced to be magnetized in a (positive) confluent state wherein both the core and shell of the Wiegand wire are magnetized in the same (positive) direction.

When the tilt sensor is tilted from this initial position to a negative inclined position (after passing through a horizontal position in which the sensor is not tilted), magnet 10 moves (i.e., slides) away from end 12B of tube 12. Magnet 10 continues to move in this direction reaching a position at which pole N of the magnet is adjacent to pole piece 18 and pole S of the magnet is passed the end of the pole piece. Some time during this motion, the above-identified magnetic flux path reverses direction so that the direction of the flux path through Wiegand wire 20 is in "the negative direction," which results in the core of Wiegand wire 20 switching its direction of magnetization from positive to negative. This is considered to be the positive reverse state of the Wiegand wire since the core magnetization is reverse that of the positive magnetization of the shell, and the switching from the positive confluent state to the positive reverse state results in a significant output pulse (known as a "Wiegand" pulse) on pickup coil 22. The pulse generated on pickup coil 22 represents the occurrence of tilt in accordance with the present invention, which pulse then is supplied to a suitable circuit (not shown).

While tilt has already been detected, resulting in the generation of an output pulse on coil 22, the Wiegand wire needs to be "reset" before the tilt sensor is able to detect another instance of tilt. Such resetting, however, is automatically accomplished by the continued movement of magnet 10 towards end 12A of tube 12. That is, as magnet 10 continues to move past pole piece 18 towards end 12A of tube 12, the magnetic flux (in the negative direction) through Wiegand wire 20 increases which causes the direction of magnetization of the shell of Wiegand wire 20 to switch from positive to negative. At this point, the core and shell of the Wiegand wire are "reset" in a negative confluent state, and the tilt sensor is ready to detect movement (i.e., tilting) of the sensor from the current negative inclined position to a positive inclined position.

When the sensor is moved from the negative inclined position to a positive inclined position, magnet 10, due to gravity, slides away from tube end 12A towards tube end 12B. Some time during this motion, the magnetic flux path through Wiegand wire 20 reverses direction from the previously mentioned negative direction to a positive direction, which results in the core of Wiegand wire 20 switching its direction of magnetization from negative to positive. At this point, the Wiegand wire is in a negative reverse state since the direction of magnetization of the core is reverse that of the negative magnetization of the shell, and the switching from the negative confluent state to the negative reverse state results in a significant output ("Wiegand") pulse on pickup coil 22. The produced output pulse thus represents detection of tilt, but in addition to signifying tilt, the output pulse produced when the Wiegand wire switches from the negative confluent state to the negative reverse state is opposite in polarity to the previously discussed output pulse that is produced when the Wiegand wire switches from the positive confluent state to the positive reverse state. Thus, both the occurrence of tilt and the direction of that tilt are detected and identified by the pulse output by the tilt sensor of the present invention.

Finally, the Wiegand wire is reset to its positive confluent state with the continued movement of magnet 10 towards tube end 12B. That is, as magnet 10 continues to move past pole piece 18 towards tube end 12B, the magnetic flux (now in the positive direction) through Wiegand wire 20 increases which causes the direction of magnetization of the shell of Wiegand wire 20 to switch from negative to positive. At this point, the core and shell of the Wiegand wire are both magnetized in the positive direction, and the tilt sensor is now ready to detect another instance of tilt.

The above-description of the operation of the Wiegand tilt sensor of the present invention has been made primarily with reference to the design shown in FIG. 1. However, the design shown in FIG. 2 also operates in the manner previously described, but with the following noted difference. Referring to FIG. 2, it is seen that magnet 10 may move substantially past either end of pole piece 18, and when magnet 10 is not near pole piece 18, there is either no or negligible magnetic flux through Wiegand wire 20. Nevertheless, the above-discussed magnetic states of the Wiegand wire are still obtained when the tilt sensor shown in FIG. 2 is moved from a positive inclined position to a negative inclined position, or is moved from a negative inclined position to a positive inclined position. That is, when magnet 10 reaches a sufficiently close distance to pole piece 18, Wiegand wire 20 changes from its reset confluent state to a reverse state (as a result of the core changing its direction of magnetization), which results in the generation of an output pulse on coil 22, and as magnet 10 continues to move past pole piece 18, the magnitude of the magnetic flux through Wiegand wire 20 increases to a point at which the shell of the Wiegand wire changes its direction of magnetization so that the Wiegand wire is again in a reset confluent state (but now opposite in polarity to its original reset confluent state).

Based on the above-noted difference between the designs shown in FIGS. 1 and 2, it is appreciated that tube 12 may be substantially similar or significantly longer in length to that of pole piece 18. However, due to general advantages gained from reducing component size, the preferred embodiment of the present invention is to provide tube 12 with a length as short as possible.

Figure 3:
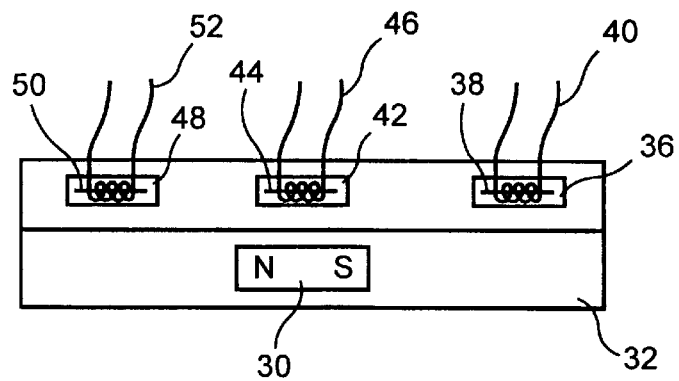
FIG. 3 is a schematic illustration of the Wiegand tilt sensor in accordance with another embodiment of the present invention.

In accordance with a further embodiment of the present invention, and now referring to FIG. 3, the tilt sensor includes an elongated, frictionless tube 32 having a two-pole magnet 30 contained and freely slidable therein. Magnet 30 and tube 32 are similar to magnet 10 and tube 12 previously discussed. The tilt sensor further includes plural sets of Wiegand wires and pole pieces, each of the Wiegand wires having a respective wire coil wound thereon. In the exemplary embodiment shown in FIG. 3, a first Wiegand wire 38 having a coil 40 wound thereon is contained within a first magnetic pole piece 36, a second Wiegand wire 44 having a coil 46 wound thereon is contained within a second magnetic pole piece 42, and a third Wiegand wire 50 having a coil 52 wound thereon is contained within a third magnetic pole piece 48. Each Wiegand wire/pole piece/coil set (hereinafter, "wire-pole set") is similar to Wiegand wire 20, pole piece 18 and coil 22 previously discussed. The plural wire-pole sets are arranged adjacent to and along tube 32 in the manner shown in FIG. 3.

The exemplary embodiment shown in FIG. 3 operates in a manner substantially similar to that previously discussed with respect to FIGS. 1 and 2. However, this exemplary embodiment is operable to detect multiple successive occurrences of tilt from a horizontal position of the sensor to a positive inclination of the sensor or, similarly, to detect multiple successive occurrences of tilt from the horizontal position to a negative inclination of the sensor. Generally, since magnet 30 is freely slidable within tube 32, the tilt sensor shown in FIG. 3 is operable to detect short instances of tilt from the horizontal position to an inclined position back to the horizontal position. While three wire-pole sets are shown in FIG. 3, other numbers of wire-pole sets may be utilized and the distances between the wire-pole sets may be chosen to accommodate the particular application.

While the present invention has been particularly shown and described in conjunction with a preferred embodiment thereof, it will be readily appreciated by those of ordinary skill in the art that various changes may be made without departing from the spirit and scope of the invention. For example, the particular shapes of the magnet, the tube through which the magnet slides and the pole piece may be different than that previously discussed.

Therefore, it is intended that the appended claims be interpreted as including the embodiments described herein, the alternatives mentioned above, and all equivalents thereto.

What is claimed is:

1. A tilt sensor, comprising:
   a non-magnetic elongated tube;
   a magnet contained and substantially freely slidable within said elongated tube;
   a Wiegand wire extending along and adjacent to said elongated tube; and
   a coil wound on the Wiegand wire.

2. The tilt sensor of claim 1, further comprising a pole piece extending along and adjacent to said elongated tube, said pole piece having a hollow interior and being comprised of a material through which a magnetic flux path can pass; and wherein said Wiegand wire extends within a portion of said hollow interior of said pole piece.

3. The tilt sensor of claim 1, wherein a pulse is produced on said coil as said magnet slides within said elongated tube.

4. The tilt sensor of claim 1, wherein a first pulse of a first polarity is produced on said coil as said magnet slides in a first direction within said elongated tube, and a second pulse of a second polarity is produced on said coil as said magnet slides in a second direction opposite to said first direction within said elongated tube, said second polarity being opposite said first polarity.

5. The tilt sensor of claim 1, wherein said magnet has two poles of opposite polarity.

6. The tilt sensor of claim 5, wherein a magnetic flux path is created for a given position of said magnet relative to a position of said elongated tube, said magnetic flux path flowing through said elongated tube, said two poles of said magnet and said Wiegand wire.

7. The tilt sensor of claim 6, wherein magnetic flux flows through said Wiegand wire in a first direction when said magnet is in a first position within said elongated tube, and magnetic flux flows through said Wiegand wire in a second direction when said magnet is in a second position within said elongated tube, said second direction being opposite to said first direction.

8. The tilt sensor of claim 1, wherein said magnet slides within said elongated tube as said tilt sensor is tilted from one inclined position to another inclined position, and a magnetic state of said Wiegand wire changes in response to the sliding of said magnet within said elongated tube.

9. The tilt sensor of claim 1, wherein said magnet is substantially freely slidable within said elongated tube such that said magnet slides to a first end of said elongated tube when said tilt sensor is in a first inclined position and said magnet slides to a second end of said elongated tube when said tilt sensor is in a second inclined position.

10. The tilt sensor of claim 1, wherein said Wiegand wire constitutes a first Wiegand wire; said tilt sensor further comprising a second Wiegand wire extending along and adjacent to a portion of said elongated tube mounted horizontally apart from said first Wiegand wire.

11. The tilt sensor of claim 10, further comprising a first coil wound on the first Wiegand wire and a second coil wound on the second Wiegand wire.

12. A method of detecting tilt, comprising the steps of:
   providing a magnet contained and substantially freely slidable within an elongated tube such that the magnet slides within the elongated tube when the tube is tilted;

creating a flux path through said magnet and a Wiegand wire located adjacent to the elongated tube by the relative position of said magnet to said Wiegand wire; and detecting tilt as a function of a change of magnetic state of said Wiegand wire as said magnet slides within the elongated tube.

13. The method of claim 12, wherein said step of creating a flux path is carried out by creating a flux path in a first direction when said magnet is in a first position within said elongated tube and creating a flux path in a second direction opposite to said first direction when said magnet is in a second position within said elongated tube.

14. The method of claim 12, further comprising the step of providing a coil wound on the Wiegand wire.

15. The method of claim 14, wherein the step of detecting tilt is carried out by producing a pulse on the coil by having the magnet slide within the elongated tube and having said Wiegand wire change magnetic state.

16. The method of claim 14, wherein the step of detecting tilt is carried out by producing a first pulse of a first polarity on the coil by having the magnet slide in a first direction within the elongated tube and having said Wiegand wire change magnetic state, and by producing a second pulse of a second polarity on the coil by having the magnet slide in a second direction opposite to the first direction within said elongated tube and having said Wiegand wire change magnetic state, said second polarity being opposite said first polarity.

* * * * *